UNITED STATES PATENT OFFICE.

PETER FERRIS, OF GREENWICH, CONNECTICUT.

IMPROVEMENT IN MAKING BLACK INK.

Specification forming part of Letters Patent No. 2,870, dated December 5, 1842.

*To all whom it may concern:*

Be it known that I, PETER FERRIS, of Greenwich, in the county of Fairfield and State of Connecticut, have invented a new and useful Improvement in the Manufacture of Black Writing-Ink; and I do hereby declare that the following is an exact description of the parts thereof and of the mode of manufacturing said ink.

Into an iron vessel put twelve gallons soft water and six pounds ground logwood, and boil it not less than three hours. Strain the liquid through a fine wire sieve, or pour it off the sediment, and add the following thereto: ten pounds nut-galls, three pounds copperas, six ounces blue vitriol, four pounds gum-arabic, one pound loaf-sugar, one pound Prussian blue, and one pound indigo. Boil these parts together five hours, and let it stand on the sediment ten or fifteen days, stirring it daily. Then strain or settle the sediment from the liquid. If there be less than nine gallons, add water to make nine gallons, and add thereto one gallon alcohol eighty per cent. above proof, and stir it daily for ten days, and let it settle three days and bottle for use.

My mode of preparing the above ingredients for my ink is to grind the nut-galls as fine as corn-meal through a pair of millstones dressed to grind coarse corn. Also the indigo and Prussian blue I grind in three gallons water in a stone mill, (constructed in the way as to grind paint,) passing it through two or three times that it may be thoroughly mixed. I add alcohol to my ink, which prevents its molding or smelling bad. This composition thus prepared forms my black writing-ink. To produce a strong and permanent color, the greater number of ingredients that are united to produce the desired color such color will be the more permanent and durable. Therefore, my ink being composed of all permanent ingredients that produce black ink, I have thereby produced the most permanent and durable black writing-ink.

What I claim as my invention, and desire to secure by Letters Patent, is—

The compounding the within-named ingredients, as herein described, for the manufacturing of black writing-ink.

PETER FERRIS.

Witnesses:
SAML. FERRIS, Jr.,
SAMUEL CLOSE.